Figure 1:
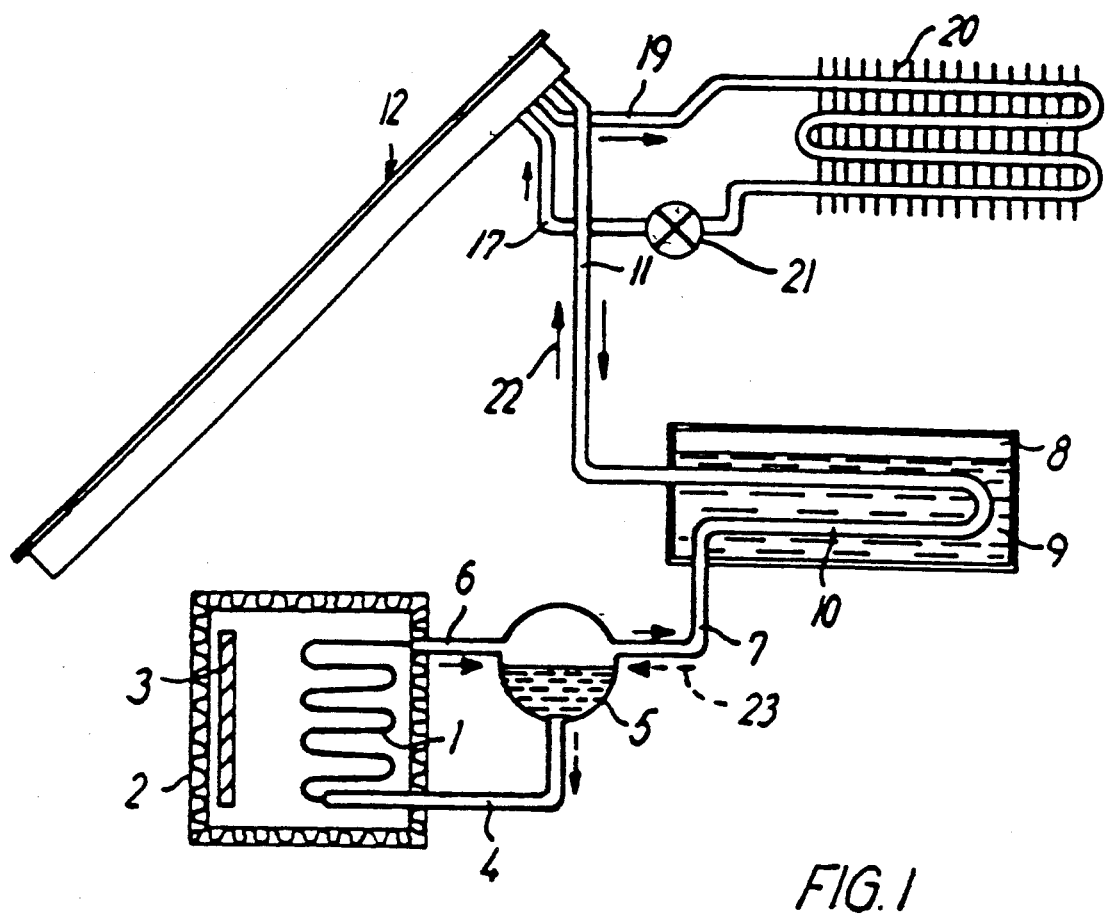

United States Patent [19]

Korsgaard

[11] Patent Number: 4,993,234
[45] Date of Patent: Feb. 19, 1991

[54] SOLAR COLLECTOR ABSORPTION COOLING SYSTEM

[75] Inventor: Peter Korsgaard, Copenhagen, Denmark

[73] Assignee: Henry Soby A/S, Hornslet, Denmark

[21] Appl. No.: 457,709

[22] PCT Filed: Apr. 6, 1988

[86] PCT No.: PCT/DK88/00063
§ 371 Date: Jan. 2, 1990
§ 102(e) Date: Jan. 2, 1990

[87] PCT Pub. No.: WO88/08109
PCT Pub. Date: Oct. 20, 1988

[30] Foreign Application Priority Data
Apr. 6, 1987 [DK] Denmark .............................. 1738/87

[51] Int. Cl.⁵ .............................................. F25B 27/00
[52] U.S. Cl. .................................. 62/235.1; 62/238.3; 62/477; 62/481; 165/104.12
[58] Field of Search ..................... 62/235.1, 238.3, 477, 62/478, 481, 482; 165/104.12

[56] References Cited
U.S. PATENT DOCUMENTS
4,586,345  6/1986  Friberg et al. ..................... 62/235.1
4,697,433  10/1987  Paeye ................................. 62/235.1

Primary Examiner—Albert J. Makay
Assistant Examiner—John Sollecito
Attorney, Agent, or Firm—Browdy and Neimark

[57] ABSTRACT

A solar collector absorption cooling system with a primary cooling circuit the evaporator (1) of which is connected with absorber ducts (26) in an absorber formed as a solar collector (12), said absorber ducts (26) including a coolant absorbing compound for the suction of coolant at night hours, and a secondary self-circulating cooling circuit with evaporator tubes (29) located in heat transferring contact with the absorber ducts (26) of the primary circuit to provide an enhanced cooling thereof. The absorber of the primary circuit is carried out as at least one sheet welded absorber panel (24, 25) and is accommodated in a solar collector frame (12) beneath and in parallel to a glass layer (15) facing the incident sun and to a thermal insulating layer (36) on the opposite side of the absorber panel. The evaporator tubes (b 29) of the secondary circuit that are made from well heat-conducting material are positioned in the valleys between the ducts (26) of the absorber panel (24, 25) facing the insulating layer (36).

4 Claims, 5 Drawing Sheets

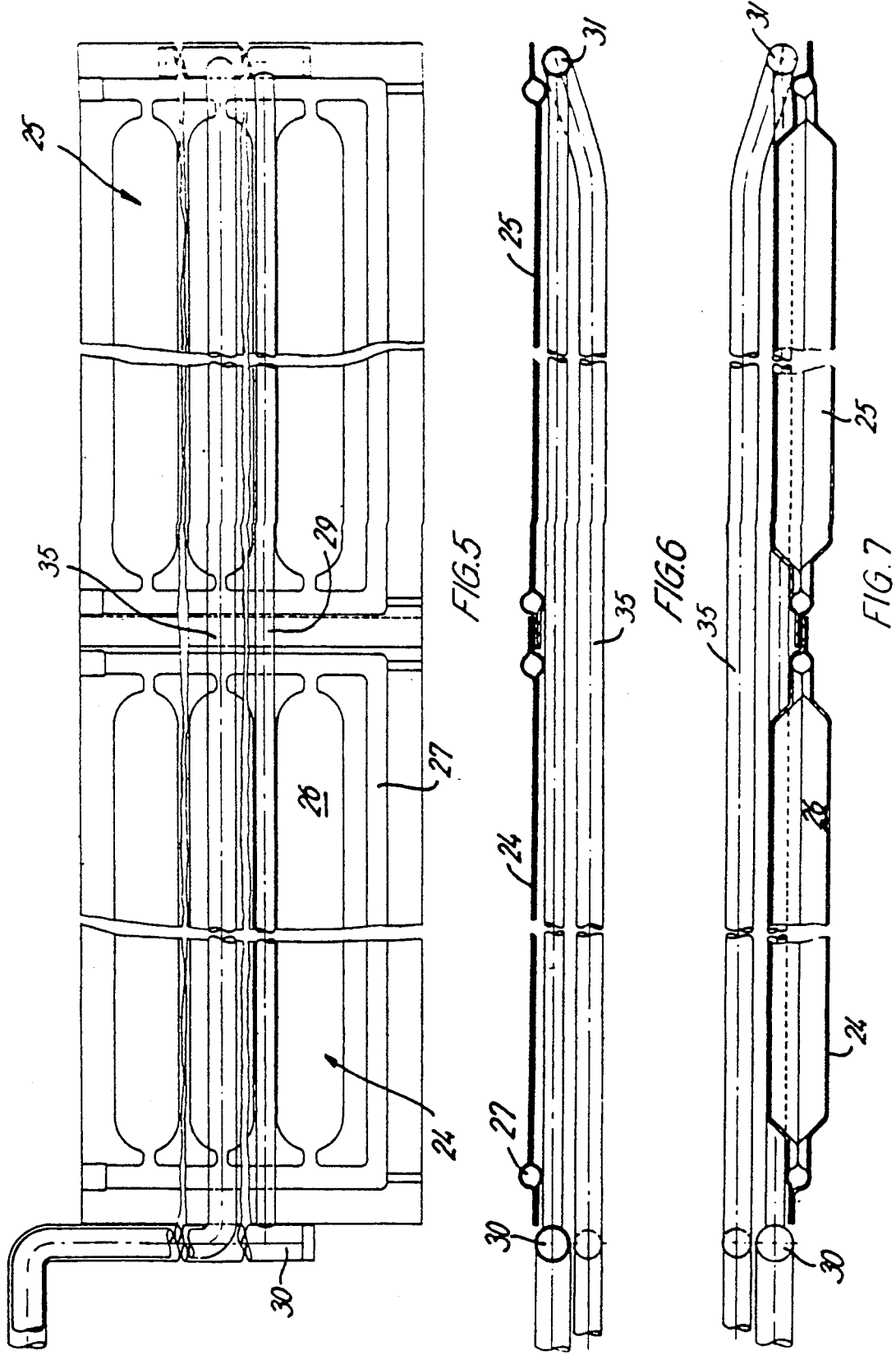

SOLAR COLLECTOR ABSORPTION COOLING SYSTEM

The invention relates to a solar collector absorption cooling system with a primary cooling circuit the evaporator of which is connected with absorber ducts in an absorber formed as a solar collector and positioned in a solar collector frame beneath and in parallel to a glass layer facing the incident sun, a thermal insulating layer being provided on the opposite side of the absorber, said absorber ducts including a coolant absorbing compound for the suction of coolant at night hours, and a secondary self-circulating cooling circuit with evaporator ducts connected to a condenser and located in heat transferring contact with the absorber ducts of the primary circuit, said secondary circuit being selectively operable to provide an enhanced cooling of the absorber ducts during the absorption process.

The exploitation of solar heat as an energy source has hitherto mainly been adopted for heating purposes, whereby different types of solar collector systems have gained interest on an equal footing with other kinds of alternative energy sources, as far as solar collector systems are concerned particularly for the heating of water with respect to tap water in buildings and for swimming pools and the like. In connection with solar powered air condition systems it is known, however, to incorporate an air cooling into a total solution in connection with water heating by combining the solar collector system with an absorption cooling system.

Particularly in the hotter regions of the world and in places where the access to electric power and other conventional energy sources is difficult or expensive, there is a great and up till now badly fulfilled need for cold producing systems for various different purposes. Thus, such requirements exist with respect to the cooling of foodstuffs, pharmaceuticals and other products which do not stand storage at an elevated temperature, as well as air conditioning in living rooms for living beings, including particularly residential rooms.

An absorption cooling system of the above mentioned type is known from international patent application No. PCT/DK84/00040, publication No. WO 84/04581, in which the solar heat is exploited as the sole energy source so that no demands are made on access to electricity and gas or other conventional forms of energy supply. The mode of operation of such a system is based on the utilization of the daily temperature variation, i.e. the temperature difference between day and night hours, to energize a periodically operating primary absorption cooling system, thereby causing the evaporation of coolant in the thermally insulated space accomodating the evaporator of the system, to take place at night hours during which the absorber is not exposed to solar energy. By means of the secondary self-circulating cooling circuit the coolant absorbing compound, e.g. calcium chloride, contained in the absorber tubes efficiently absorbs substantially the total amount of coolant prevailing in the primary circuit during the cooling period.

At the beginning of day hours the secondary circuit is interrupted and the absorber tubes are rapidly heated to a temperature at which they can no longer retain the absorbed coolant quantity which is expelled to the condenser of the primary circuit from which coolant in the liquid state is transferred to the coolant vessel of the primary circuit, said vessel collecting during day hours substantially the entire coolant quantity and retaining it until the evaporation starts again as a result of coolant absorption in the absorber tubes.

To obtain a good heat transferring contact between the coolant absorbing compound in the absorber tubes of the primary circuit and the evaporator tubes of the seconday circuit it is prescribed as regards the above mentioned cooling system that the latter evaporator tubes must extend coaxially within the absorber tubes in direct heat transferring contact with the coolant absorbing compound in the form of so-called finned or ribbed tubes dividing the absorber tube into a number of compartments to ensure an even dispersion of the coolant absorbing compound.

However, this embodiment makes the absorber so complicated and expensive to manufacture that it is less fitted for industrial production and, therefore, it is an object of the invention to offer a solution which particularly provides for obtaining a considerable simplification and price reduction.

This is obtained according to the invention in that the absorber of the primary circuit is carried out as at least one sheet welded absorber panel by joining two plate members pressed into a wave-shaped profile in adjacent valleys, the evaporator ducts of the secondary circuit being made from well heat-conducting material and being positioned in the valleys of the absorber panel facing the insulating layer.

By carrying out the absorber as one or more sheet welded panels the manufacturing of such absorber panels may be effected by means of conventional automatic welders in the same manner as usual plate radiators and by arranging the absorber ducts more closely which is possible in such a sheet welded panel, an increase of the number of absorber ducts within a certain solar collector area is obtained.

In view of the fact that the evaporator tubes of the seconday circuit are moved outside the absorber ducts of the primary circuit but are still in good heat transferring contact therewith, the absorber ducts may adopt a larger quantity of the coolant absorbing compound which in itself increases the absorption capacity, thereby making less heavy demands on the cooling effect of the secondary circuit and resulting in a considerable improvement of the capacity and efficiency of the system. The arrangement of the evaporator tubes of the secondary circuit in the wave valleys has in practice shown to entail a fully sufficient cooling of the absorber tubes.

Figure 2:
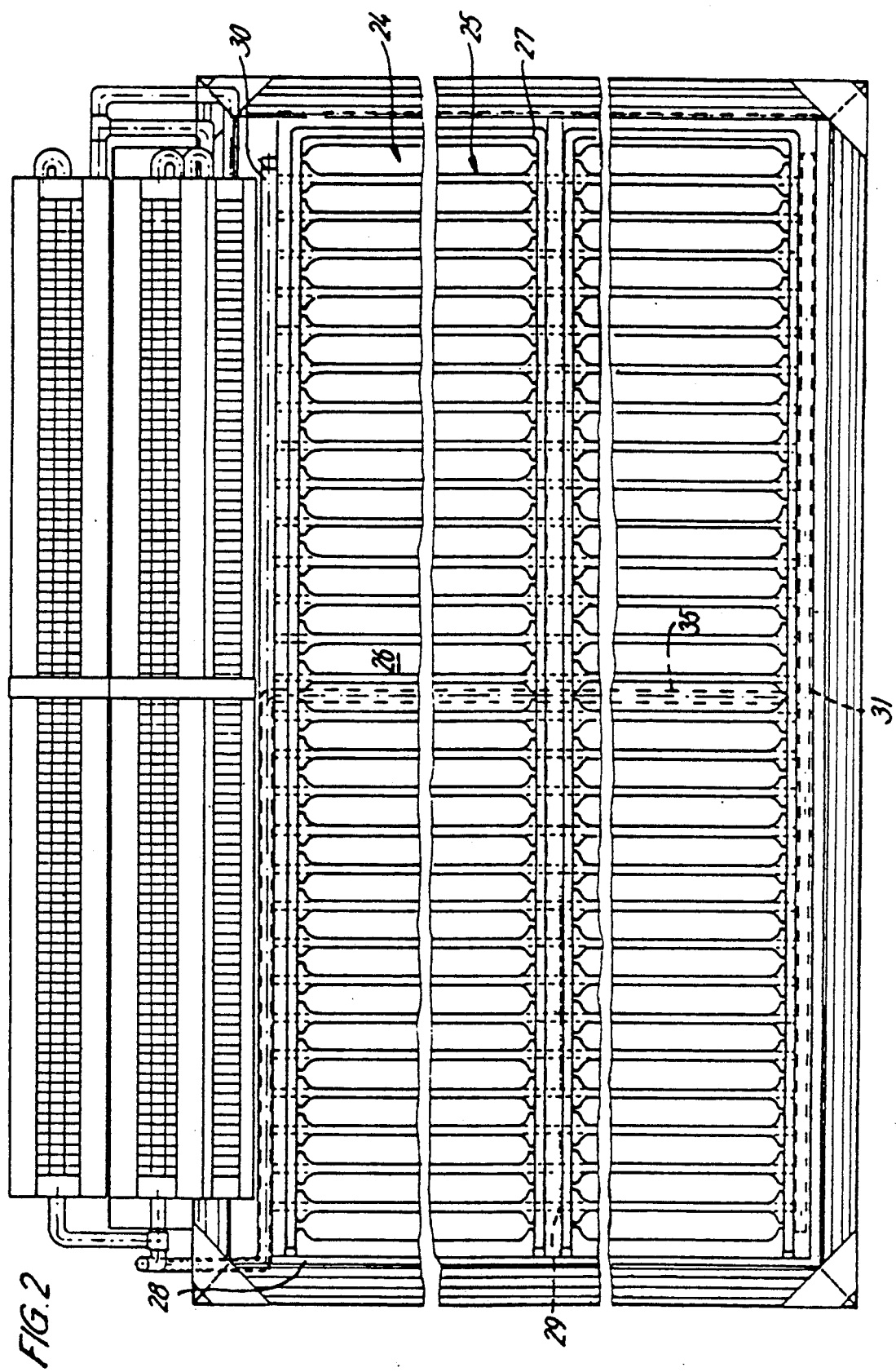
Figure 3:
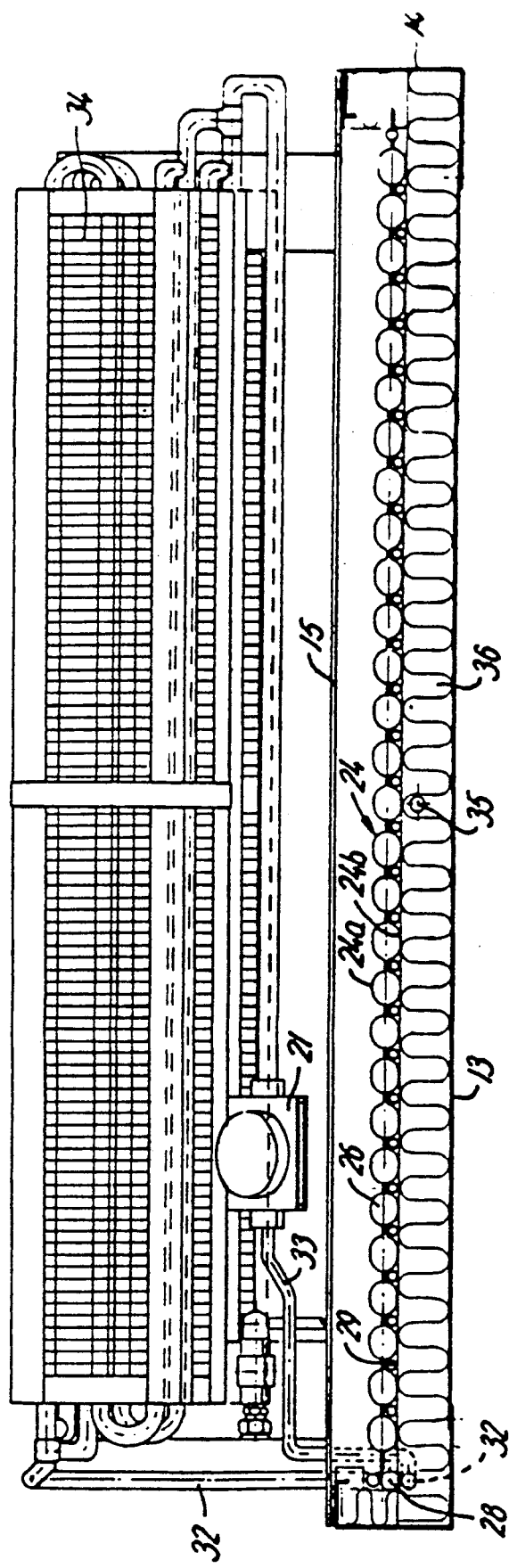
Figure 4:
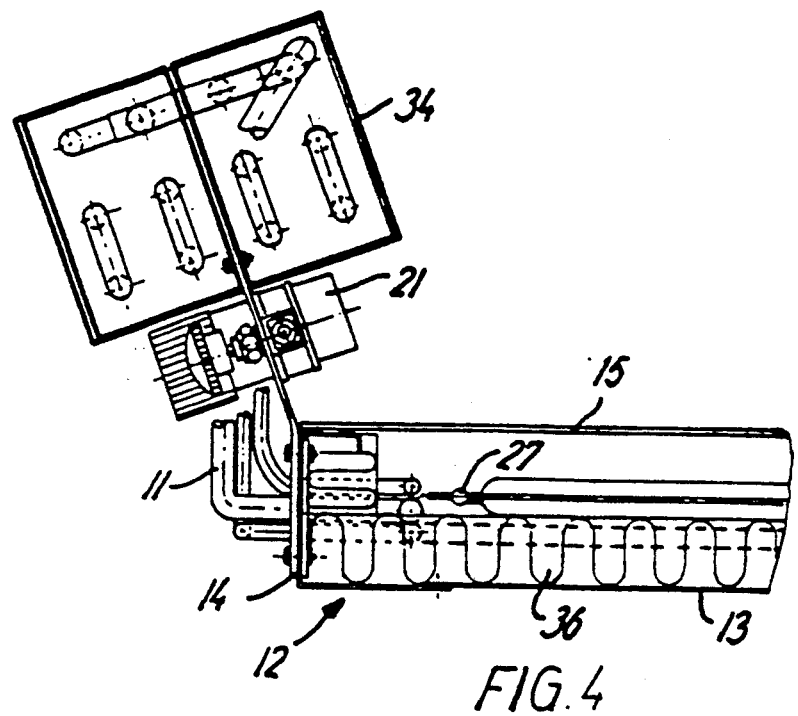
Figure 8:
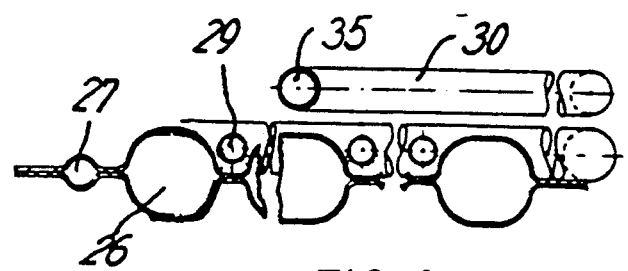

In the following the invention will be explaied in further detail with reference to the drawings, in which FIG. 1 shows a simplified flow sheet of a solar collector absorption cooling system, FIGS. 2 to 4 illustrate a preferred embodiment of a solar collector unit for use in a cooling system according to the invention, FIGS. 5 to 8 show details of the design of the absorber panels of the solar collector on a larger scale.

In the cooling system illustrated in FIG. 1 the coolant evaporator 1 is accommodated in a thermally insulated space 2 for which cooling is desired. Space 2 may for instance constitute a cooling box for foodstuffs, pharmaceticals or other products for which cold storage is desired whereby, in consideration of the periodical operation of the system to be specifically explained in the following, a cold reservoir 3 may be provided in space 2 to maintain a low temperature in the period during which no evaporation of coolant takes place.

However, the space or container 2 may for example also constitute a cooling or freezing space for the production of ice blocks or a cooling chamber for an air conditioning system.

Through an inlet line 4 for coolant in the liquid state evaporator 1 is connected with a coolant vessel 5 having a capacity exceeding the total coolant quantity of the system. Evaporator 1 is further connected through an outlet line 6 for coolant in the vapour state to vessel 5 at a higher level than the liquid level when the total coolant quantity of the system is collected in vessel 5.

An inlet tube 7 for coolant in the liquid state to vessel 5 constitutes the lowermost part of a single tube connection between vessel 5 and the absorber of the system, since inlet tube 7 is connected to the bottom of a condenser 8 having a water reservoir 9 through which the single tube connection extends as a tube coil 10. The part of the tube connection positioned at a higher level is constituted by a tube part 11 between condenser 8 and the absorber 12.

Absorber 12 is designed as a solar collector and comprises, as will be explained in the following, a number of sheet welded absorber panels communicating with tube 11 at the uppermost end of the solar collector 12 which in this case is shown to be oblique for the installation in an inclined roof.

Moreover, a secondary cooling circuit comprising an evaporator with evaporator tubes arranged in heat transferring contact with the absorber panels is connected to the solar collector unit 12 as explained in the following and communicates through an inlet conduit 17 and an outlet conduit 19 with a condenser 20, a blocking valve 21 being inserted in inlet conduit 17.

The circulation of coolant in the two cooling circuits is shown by arrows of which the solid arrows 22 designate coolant in the vapour state, whereas the dashed arrows 23 designate coolant in the liquid state. The system is operating periodically in a day and night cycle, in which the evaporation of coolant in evaporator 1 takes places at night hours when, on one hand, absorber 12 is not exposed to solar energy and, on the other hand, is exposed to further cooling by the secondary cooling circuit. The absorber panels of solar collector unit 12 thereby attain a low temperature at which a coolant absorbing compound contained in the absorber panels has a strong absorbing effect relative to the evaporated coolant. As a result thereof the total coolant quantity in the system, which at the beginning of the evaporation period is collected in the coolant vessel 5 will in the course of the evaporation period be sucked into the coolant absorbing compound in the absorber panels dimensioned to accommodate a compound quantity having an absorption capacity corresponding at least to the total coolant quantity.

During day hours the influence of solar rays will cause a temperature increase in the absorber and the circulation in the secondary circuit is moreover interrupted by the blocking valve 21 which may for example be time-controlled or activated by the heat of the sun, as explained in the above mentioned international patent application.

With the temperature increase caused thereby the coolant absorbing compound in the absorber panels can no longer retain the absorbed coolant quantity, but delivers the coolant in the vapour state at increasing temperature through the tube connection 11 to condenser 8 from which coolant in the liquid state is supplied to collecting vessel 5 through tube 7.

After the end of the day hours functioning as a regeneration period the process is repeated by the cooling of the absorber no longer exposed to solar energy, and the opening of the blocking valve 21 for circulation of coolant in the secondary circuit.

As illustrated in FIGS. 2 to 4 the solar collector unit 12 is designed as a flat boxlike frame with a closed bottom 13 in communication with side walls 14 and a glass layer 15 facing the incident sun.

In the illustrated embodiment the solar collector unit 12 includes two sheet welded absorber panels 24 and 25 located substantially in the same plane beneath glass plate 15 and individually provided by welding together two plate members that are pressed into a wave-shaped profile, in the opposed wave valleys of the members, as illustrated by 24a and 24b in FIG. 3. A great number of parallel absorber ducts 26 is thereby provided between said two plate members 24a and 24b, said ducts being individually connected at their ends to a distributing duct 27 extending along the edge of the absorber panel concerned.

The distributing ducts 27 of either absorber panel 24 and 25 communicate at one end of the panels with a manifold 28 through which the absorber ducts 26 are connected with the pipe connection 11 illustrated in FIG. 4 and communicating with the remaining parts of the primary cooling circuit.

In the illustrated embodiment the evaporator ducts in the secondary cooling circuit are constituted by well heat-conducting tubes 29, e.g. copper tubes, positioned as illustrated in FIG. 3 in the valleys of absorber plates 24 and 25 on the side facing away from glass plate 15. As illustrated in FIG. 2 each of said evaporator tubes 29 extends through aligned valleys in both absorber panel 24 and 25 between distributing tube 30 and 31 at opposite, longitudinal side walls of the solar collector unit 12.

The distributing tubes 30 and 31 for evaporator tubes 29 communicate through short external tube connections 32 and 33 with the condenser 34 of the secondary circuit which, as illustrated most clearly in FIG. 4, is positioned in close proximity of the solar collector unit 12 in order to make the tube connections as short as possible. Distributing tube 31 located at the lateral edge of the solar collector unit 12 opposite with respect to the entrance of tube connections 32 and 33 is thereby connected with tube 33 via an internal tube connection 35 which as illustrated in FIGS. 2 and 3 extends beneath absorber panels 24 and 25.

Tube connection 33 accommodates as illustrated in FIG. 3 a blocking valve 21 which as mentioned may be time-controlled for changing over between the absorption and regeneration periods of the system at convenient times adapted to local sunrise and sunset.

At the side walls 14 and along bottom 13 the solar collector unit 12 is, as shown in FIG. 3, provided with a layer 36 of thermal insulating material, e.g. mineral wool, preferably filling all the space between the bottom of the solar collector unit and absorber plates 24 and 25.

The design of absorber panels 24 and 25 and the evaporator system of the secondary circuit appears more clearly from the detailed illustrations in FIGS. 5 to 8. In the illustrated embodiment, absorber panels 24 and 25 are well suited for industrial manufacture by using automatic welders and, since some of the absorber panels may be uniformly manufactured and in equal sizes, the embodiment further allows for a modular structure, so that in a given solar collector unit a number of absorber panels are arranged which is suitable for the desired capacity of the acutual system.

The mounting may be effected in a corresponding simple manner, installing at first in the solar collector unit the evaporator system of the secondary cooling circuit with evaporator tubes 29, distributing tubes 30 and 31 and tube connections 34. After positioning the thermal insulating material 36, absorber panels 24 and 25 may be mounted directly upon evaporator tubes 29 on which the absorber tubes are supported with distributor tubes 27.

With a view to arranging a plurality of juxtaposed absorber panels in the same solar collector unit the absorber panels may advantageously, as illustrated in FIG. 6, be designed in such a manner that the welding flanges extending outside distributing tubes 27 are located at different heights at the longitudinal sides of the absorber panel so that these flange portions of two neighbouring panels may overlap each other.

The illustrated and described embodiment is not limiting to the invention. In particular, the evaporator ducts of the secondary cooling circuit do not need to be constituted by separate tubes, but they may be formed in a sheet welded design, e.g. corrugated, which is complementary of the corrugated form of the absorber panel on the surface opposite the insulation.

I claim:

1. A solar collector absorption cooling system with a primary cooling circuit having an evaporator (1) which is connected with absorber ducts (26) in an absorber formed as a solar collector (12) and positioned in a solar collector frame (12) beneath and parallel to a glass layer (15) with said absorber having a side facing incident solar radiation a thermal insulating layer (36) being provided on an opposite side of the absorber, said absorber ducts (26) including a coolant absorbing compound for the suction of coolant at night hours, and a secondary self-circulating cooling circuit with evaporator ducts (29) connected to a condenser (20; 34) and located in heat transferring contact with the absorber ducts (26) of the primary circuit, said secondary circuit being selectively operable to provide an enhanced cooling of the absorber ducts (26) during the absorption process, characterized in that the absorber of the primary circuit is formed from at least one sheet welded absorber panel (24, 25) by joining two plate members (24a, 24b) pressed into a wave-shaped profile in adjacent valleys, the evaporator ducts (29) of the secondary circuit being made from highly heat-conducting material and being positioned in the valleys of the absorber panel (24, 25) facing the insulating layer (36).

2. A solar collector absorption cooling system as claimed in claim 1, characterized in that the thermal insulating layer (36) substantially fills a space between the side of the absorber panel (24, 25) facing away from the glass layer (15) and a bottom (13) of the solar collector frame (12).

3. A solar collector absorption cooling system as claimed in claim 1 characterized in that the absorber includes a number of absorber panels (24, 25) located substantially in the same plane and individually provided with a number of parallel absorber ducts (26) having ends which are connected with a distributing duct (27) extending along an edge of the panel and communicating at one end of the panel with a common manifold (28) for the evaporator (1) of the primary circuit.

4. A solar collector absorption cooling system as claimed in claim 1, characterized in that the condenser (34) of the secondary circuit is located close to the solar collector frame (12) and is connected through inlet and outlet tubes (32, 33) with distributing ducts (30, 31) for the evaporator ducts (29) of the secondary circuit extending along parallel lateral edges of the solar collector frame (12).

* * * * *